(12) United States Patent
Tanaka

(10) Patent No.: US 6,335,740 B1
(45) Date of Patent: *Jan. 1, 2002

(54) DATA PROCESSING APPARATUS AND METHOD FOR FACILITATING ITEM SELECTION BY DISPLAYING GUIDANCE IMAGES

(75) Inventor: Mitsuharu Tanaka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,170

(22) Filed: Oct. 14, 1998

(30) Foreign Application Priority Data

Oct. 23, 1997 (JP) ............................................. 9-291352

(51) Int. Cl.⁷ ................................................. G06F 3/14
(52) U.S. Cl. ...................................... 345/764; 345/822
(58) Field of Search ................................ 345/326, 334, 345/336, 338, 339, 348, 349, 977, 700, 705, 706, 708, 709, 711, 715, 764, 765, 810, 821, 822, 823, 835, 860

(56) References Cited

U.S. PATENT DOCUMENTS

| | | |
|---|---|---|
| 5,287,448 A | 2/1994 | Nicol et al. .................. 345/707 |
| 5,469,540 A | 11/1995 | Powers, III et al. ..... 707/500.1 |
| 5,524,195 A | 6/1996 | Clanton, III et al. ......... 725/61 |
| 5,564,004 A | 10/1996 | Grossman et al. .......... 345/835 |
| 5,748,927 A | 5/1998 | Stein et al. .................. 345/711 |
| 5,754,179 A * | 5/1998 | Hocker et al. .............. 345/835 |
| 5,821,928 A | 10/1998 | Melkus et al. .............. 345/809 |
| 5,923,325 A | 7/1999 | Barber et al. ................ 345/711 |

* cited by examiner

Primary Examiner—Crescelle N. dela Torre
(74) Attorney, Agent, or Firm—Fitzpatrick, Cella, Harper & Scinto

(57) ABSTRACT

A data processing apparatus having a function to control a cathode-ray tube (CRT). A plurality of items, selectable by an operator, are displayed on a screen of the CRT, and a guidance image to draw attention of the operator is superimposed on, or displayed near specified items in order to bring operator's attention to the specified items.

24 Claims, 11 Drawing Sheets

DATA PROCESSING APPARATUS AND METHOD FOR FACILITATING ITEM SELECTION BY DISPLAYING GUIDANCE IMAGES

BACKGROUND OF THE INVENTION

The present invention relates to a data processing apparatus and method thereof, a memory medium, and a computer readable program. More particularly, the present invention relates to a data processing apparatus having a function to control a display device, a method of data processing, a memory medium which serves to execute the method, and a computer readable program.

There are data processing apparatuses available which enable a user to select a desired item from a plurality of items displayed on a screen of the display device.

In the conventional data processing apparatus, items not selectable by a user are not highlighted on the screen of the display device so that the user can easily recognize selectable items in a plurality of displayed items.

However, for a user who is not accustomed to operating the data processing apparatus, it is not easy to select an appropriate item from the plurality of listed selectable items.

SUMMARY OF THE INVENTION

The present invention is made in consideration of the above situation, and has as its object to facilitate selection of an appropriate item from a plurality of selectable items displayed on a display device.

A data processing apparatus according to the present invention, having a function to control a display device, comprises: item display means for displaying a plurality of items, selectable by an operator, on a screen of the display device; and guidance image display means for superimposing one or more guidance images, provided to draw attention of the operator, on one or more specified items of the plurality of items or displaying the one or more guidance images near the one or more specified items.

According to an aspect of the present invention, the guidance image display means displays the guidance image at a predetermined position of the screen of the display device upon starting an application program, then divides the guidance image into a number of guidance images corresponding to specified items, and superimposes the divided guidance images on the respective specified items or displays the divided guidance images near the respective specified items.

According to an aspect of the present invention, the guidance image display means displays the guidance image at a predetermined position of the screen of the display device upon starting an application program, then divides the guidance image into a number of guidance images corresponding to specified items, and moves the divided guidance images to the respective specified items.

According to an aspect of the present invention, when the guidance image display means moves the divided guidance images to the respective specified items, said guidance image display means moves each of the guidance images such that the guidance image draws a swirling locus.

According to an aspect of the present invention, after said guidance image display means moves the divided guidance images to the respective specified items, said guidance image display means superimposes each of the guidance images on the respective specified items or displays each of the guidance images near the respective specified items.

According to an aspect of the present invention, when said guidance image display means superimposes each of the guidance images on the respective specified items or displays each of the guidance images near the respective specified items, said guidance image display means changes the size of each guidance image.

According to an aspect of the present invention, it is preferable that the data processing apparatus further comprises guidance image deleting means for deleting the one or more guidance images from the screen of the display device after an operator selects an item from the plurality of selectable items.

According to an aspect of the present invention, said guidance image is preferably an image having a predetermined shape and a color of a higher brightness than other parts of the screen.

According to an aspect of the present invention, said guidance image is preferably an image of a substantial circle having a higher brightness than other parts of the screen.

According to an aspect of the present invention, said guidance image is preferably a spotlight-like image.

According to an aspect of the present invention, it is preferable that the data processing apparatus further comprises switch means for switching whether or not said guidance image display means is to be activated.

Furthermore, the data processing method according to the present invention for controlling an image displayed on a display device, comprises the steps of: displaying a plurality of items, selectable by an operator, on a screen of the display device; and superimposing one or more guidance images, provided to draw attention of the operator, on one or more specified items of the plurality of items or displaying the one or more guidance images near the one or more specified items.

Moreover, the memory medium according to the present invention is a memory medium storing program codes for controlling an image displayed on a display device, said program codes including: codes for a step of displaying a plurality of items, selectable by an operator, on a screen of the display device; and codes for a step of superimposing a guidance image, provided to draw attention of the operator, on a specified item of the plurality of items or displaying the guidance image near the specified item.

Furthermore, the computer readable program according to the present invention for controlling an image displayed on a display device, comprises the steps of: displaying a plurality of items, selectable by an operator, on a screen of the display device; and superimposing a guidance image, provided to draw attention of the operator, on a specified item of the plurality of items or displaying the guidance image near the specified item.

Further objects, features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENT

Preferred embodiment of the present invention will be described in detail in accordance with the accompanying drawings.

Figure 1:
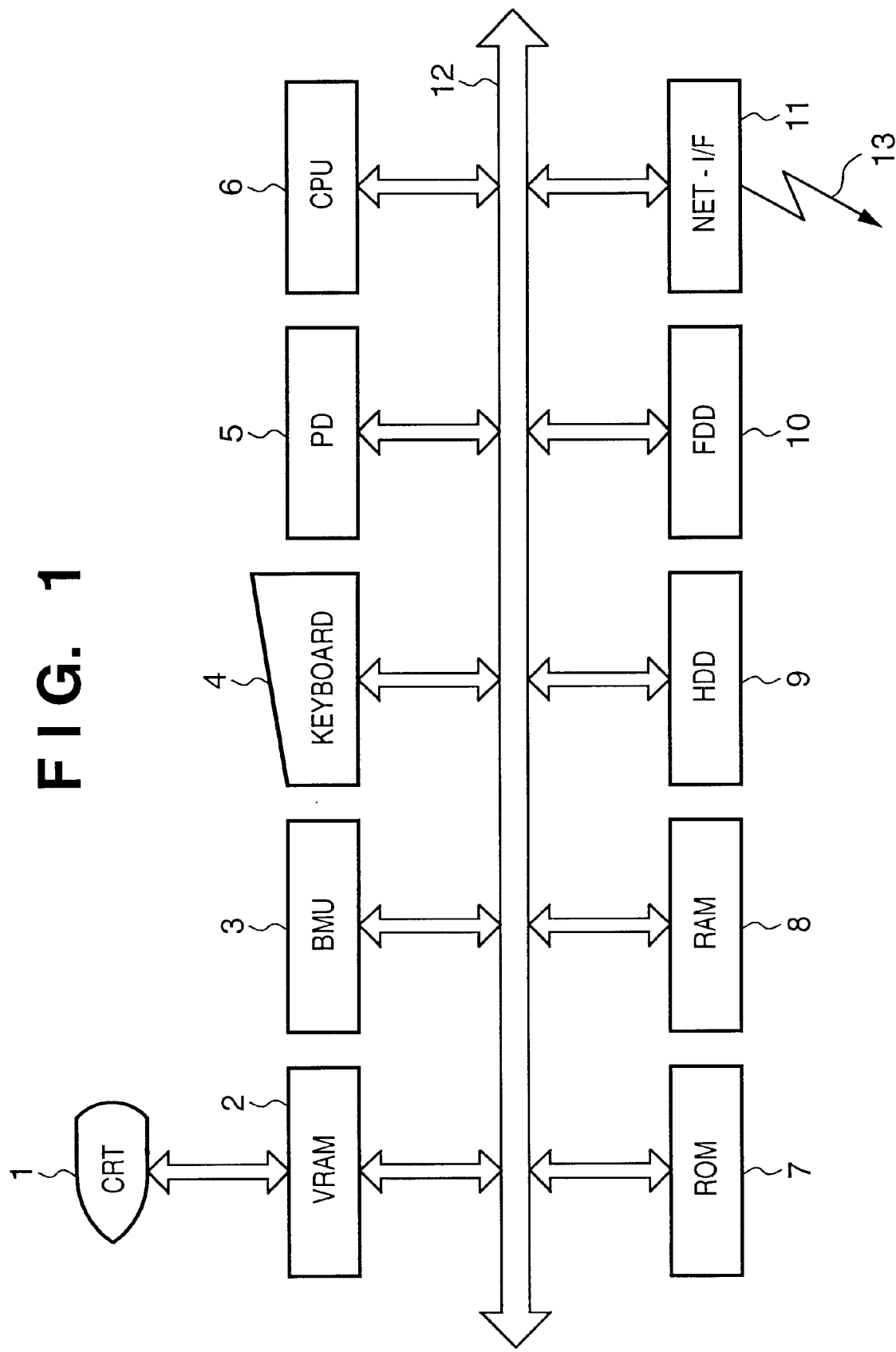
FIG. 1 is a block diagram showing a construction of a data processing apparatus according to a preferred embodiment of the present invention.

FIG. 1 is a block diagram showing a construction of a data processing apparatus according to a preferred embodiment of the present invention. Reference numeral 1 denotes a CRT (display device), and on its display screen, for instance, a document to be edited, figures, images or other editing information, icons, messages, menu and other interface information are displayed. Reference numeral 2 denotes a VRAM wherein images to be displayed on the display screen of the CRT 1 are stored. Image data stored in the VRAM 2 is transferred to the CRT 1 in accordance with a predetermined specification, and an image is displayed on the CRT 1. Reference numeral 3 denotes a bit move unit (BMU) which, for instance, controls data transfer between memories (e.g., VRAM 2 and other memories) or between a memory and other I/O devices (e.g., network interface unit 11).

Reference numeral 4 denotes a keyboard having various keys for inputting text data or the like. Reference numeral 5 denotes a pointing device used for designating, e.g., an icon, menu or other objects displayed on the CRT 1. Reference numeral 6 denotes a CPU which controls each device connected to a CPU bus 12 based on control programs stored in hard disk or floppy disk. Reference numeral 7 denotes a ROM for storing various control programs and data.

Reference numeral 8 denotes a RAM which includes a work area for the CPU 6, a temporary data-saving area at the time of error processing and a control program loading area. Reference numeral 9 denotes a hard disk drive (HDD) for controlling accesses to hard disk. Reference numeral 10 denotes a floppy disk drive (FDD) for controlling accesses to floppy disk.

Reference numeral 11 denotes a network interface unit for performing communication with other data processing apparatuses, printers or the like via a network 13. Reference numeral 12 denotes a CPU bus including address bus, data bus and control bus.

Control programs for the CPU 6 may be provided by the ROM 7, hard disk or floppy disk, or from other data processing apparatus via network 13.

Figure 11:
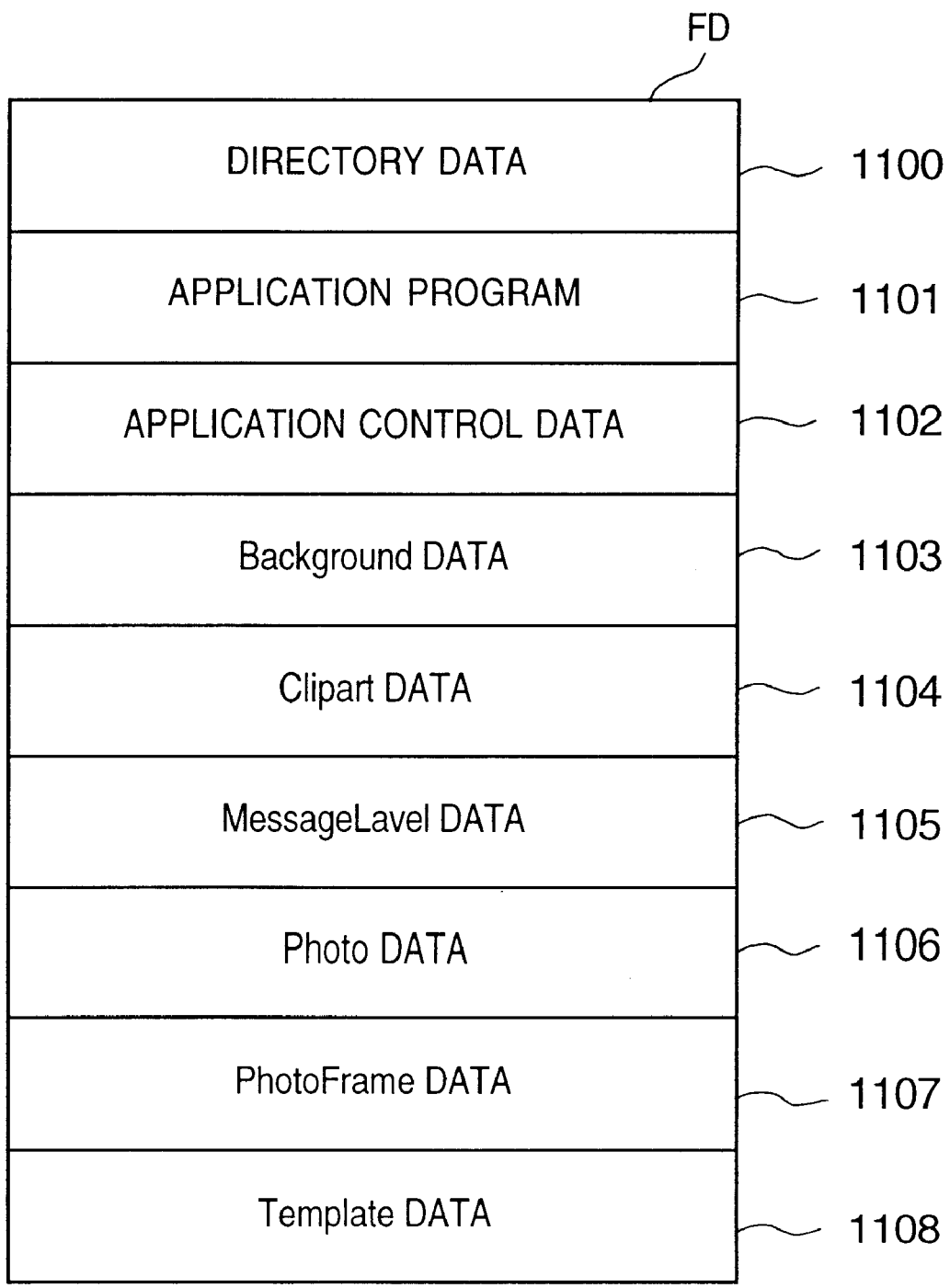
FIG. 11 is a memory map of a floppy disk, shown as an example, where control programs are stored.

FIG. 11 is a memory map of a floppy disk, shown as an example, where control programs are stored. It goes without saying that a floppy disk or other memory media storing the control program, or the control program itself constitute the statutory invention.

Referring to FIG. 11, reference numeral 1100 denotes an area where directory data is stored, and data, indicative of memory areas in the modules 1101 to 1108, is stored. Reference numeral 1101 denotes an application program. In the example given in the present embodiment, the application program 1101 controls editing an image. Reference numeral 1102 denotes application control data referred to when the application program 1101 is executed. Reference numeral 1103 denotes background data (Background data) which defines a background of an editing image; 1104, object data (Clipart data) which defines an object (e.g. an image such as illustration) to be pasted on an editing sheet; 1105, message label data (MessageLabel data) which defines a label where a message is written; 1106, photo data (Photo data); 1107, photo frame data (PhotoFrame data) which defines a frame into which photo data is framed; and 1108, template data (Template data) which defines a template.

Programs and data stored in a floppy disk may be transferred to hard disk by the hard disk driver 9 and may be stored in the data processing apparatus shown in FIG. 1.

Next, operation of the data processing apparatus based on the application program 1101 is described. FIGS. 2 to 8 show what is displayed on the screen of the CRT when the application program 1101 is executed.

Figure 2:
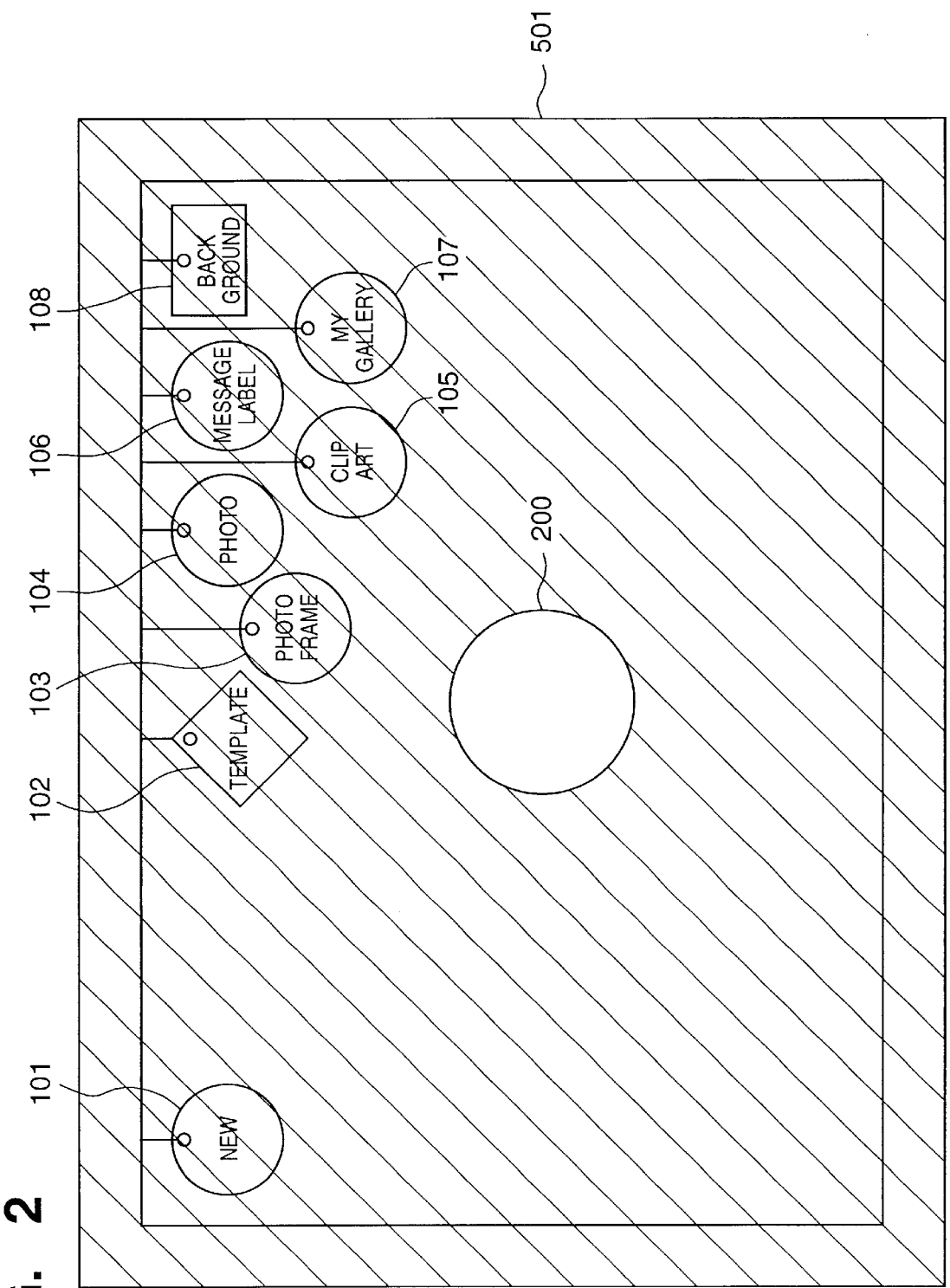
FIGS. 2 to 8 are drawings of a screen of a cathode-ray tube (CRT) shown in FIG. 1.

Upon starting the application program 1101, an image 501 is first displayed on the display screen of the CRT 1 as shown in FIG. 2. The image 501 includes a plurality of items 101 to 108 selectable by a user.

Figure 6:
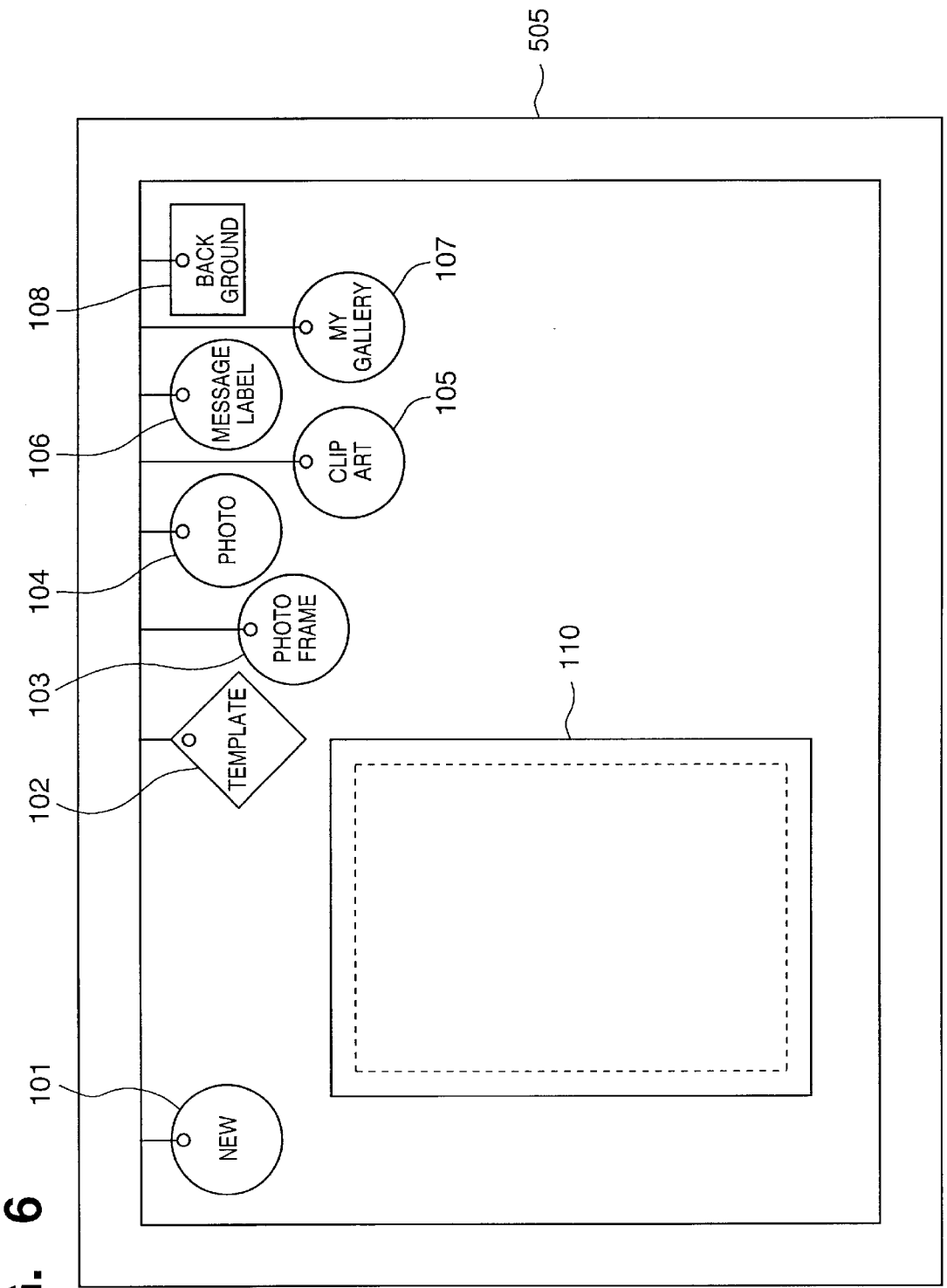

Item 101 denotes an item (New) selected at the time of editing a new image. When a user selects the item New 101 by operating the pointing device 5, a new sheet 110 is displayed as shown in FIG. 6.

Figure 7:
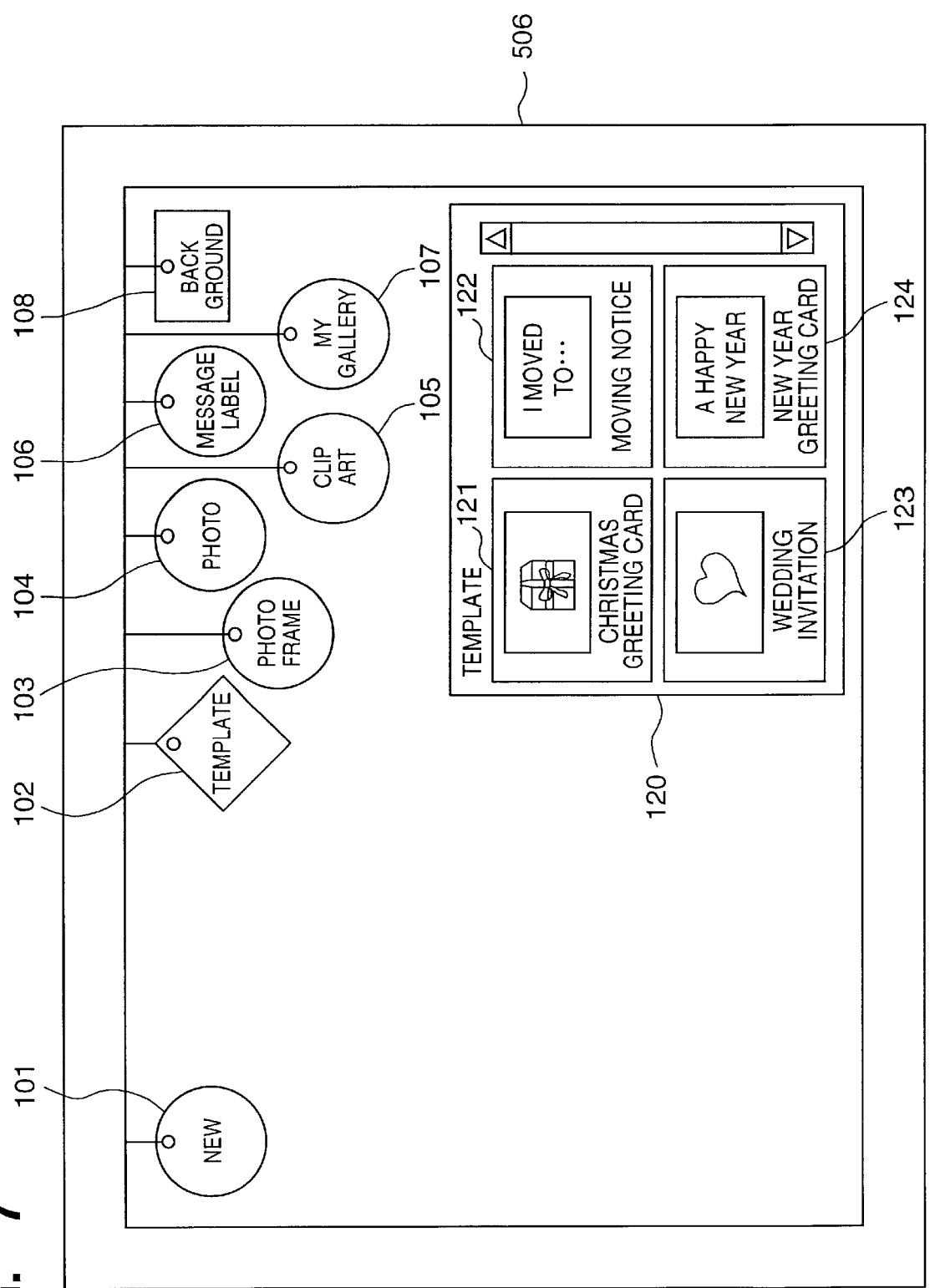

Item 102 denotes an item (Template) selected at the time of referring to a template. When a user selects the item Template 102 by operating the pointing device 5, a list of template 120 is displayed as shown in FIG. 7. The user is able to select a desired template from the list of template 120.

Item 103 denotes an item (PhotoFrame) selected at the time of referring to a frame (photo frame), into which photo data (image data) is framed. When a user selects the item PhotoFrame 103 by operating the pointing device 5, a list of photo frames is displayed.

Item 104 denotes an item (Photo) selected at the time of referring to a list of photo data. When a user selects the item Photo 104 by operating the pointing device 5, a list of photo data is displayed.

Item 105 denotes an item (ClipArt) selected at the time of referring to a list of objects (e.g., an image such as illustration) to be pasted on an editing sheet. When a user selects the item ClipArt 105 by operating the pointing device 5, a list of objects is displayed.

Item 106 denotes an item (MessageLabel) selected at the time of referring to a list of message labels. When a user selects the item MessageLabel 106 by operating the pointing device 5, a list of message labels is displayed.

Figure 8:
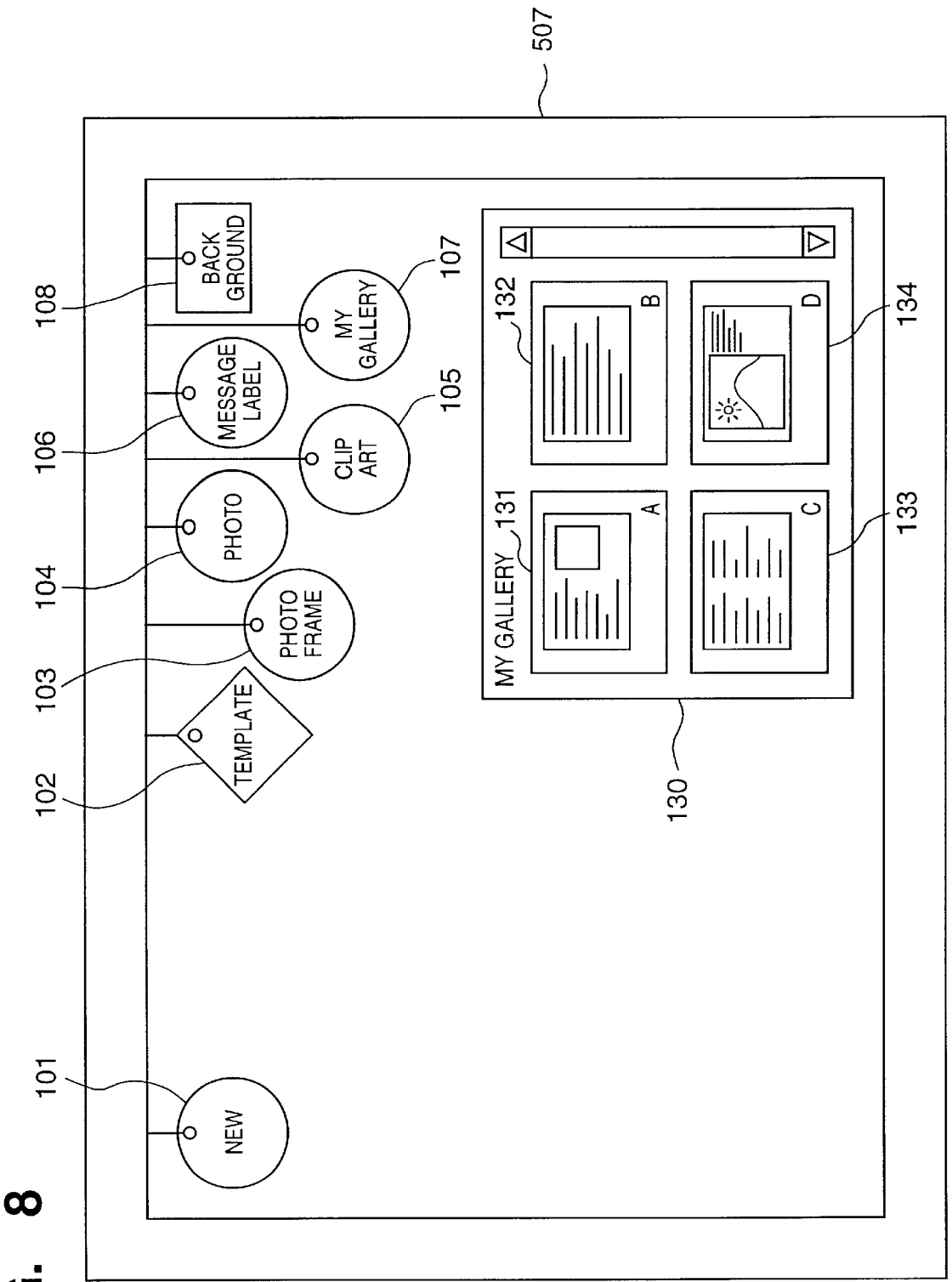

Item 107 denotes an item (MyGallery) selected at the time of referring to a list of existing editing images. When a user selects the item MyGallery 107 by operating the pointing device 5, a list of existing editing images 130 is displayed as shown in FIG. 8. A user is able to select a desired editing image from the list of editing images 130.

Item 108 denotes an item (Background) selected at the time of referring to a list of backgrounds. When a user selects the item Background 108 by operating the pointing device 5, a list of backgrounds is displayed.

As described above, the list data for each of the foregoing items is provided by, e.g., a floppy disk storing the list data as shown in FIG. 11.

In the image 501, a guidance image 200, provided to draw attention of a user, is included in a predetermined position (e.g., in the substantial center). As the guidance image 200, for instance, a spotlight-like, substantially circular image, having a high brightness is preferable (e.g., a circular white image). In this case, it is preferable that the portions other than the guidance image 200 in the image 501 have a color of a low brightness. Note that hatched portions in FIGS. 2 to 5 indicate portions having a low brightness.

By displaying the guidance image 200, for instance, in the substantial center of the display screen, it is possible to arouse user's attention, i.e., bring user's eyes to the guidance image 200.

In the present embodiment, among selectable items 101 to 108, items which are likely to be used by an operator upon starting the application program 1101 (hereinafter referred to as specified items), i.e., item New 101, item Template 102 and item MyGallery 107, are displayed distinguishably from other items. Note that the number of specified items can be changed in accordance with contents of the application program.

More specifically, after the image 501 shown in FIG. 2 is displayed for a predetermined period of time, the guidance image 200 is divided into three parts, then the divided guidance images move toward the respective items 101, 102 and 107, and are superimposed on the respective items.

Figure 3:
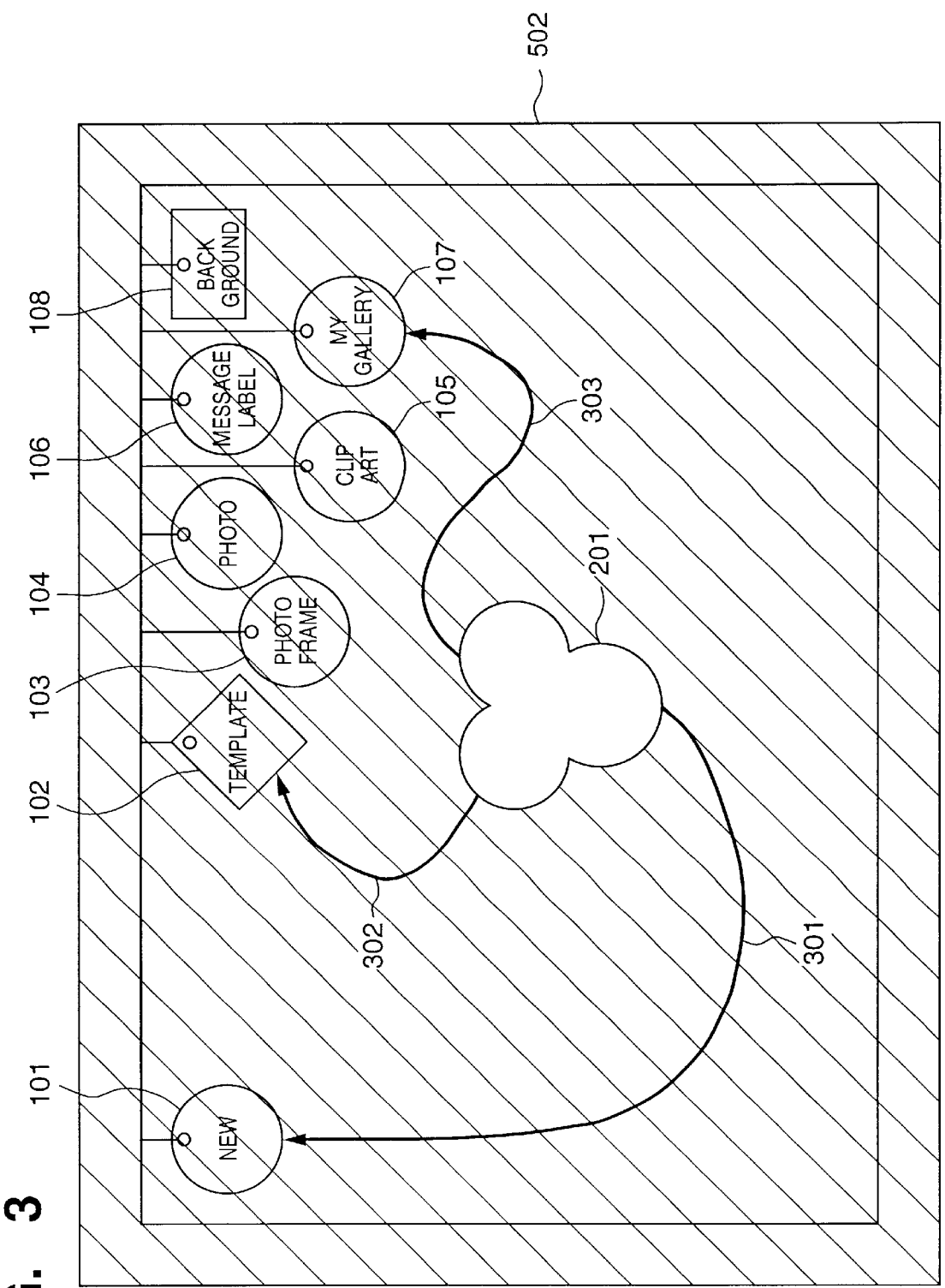
Figure 4:
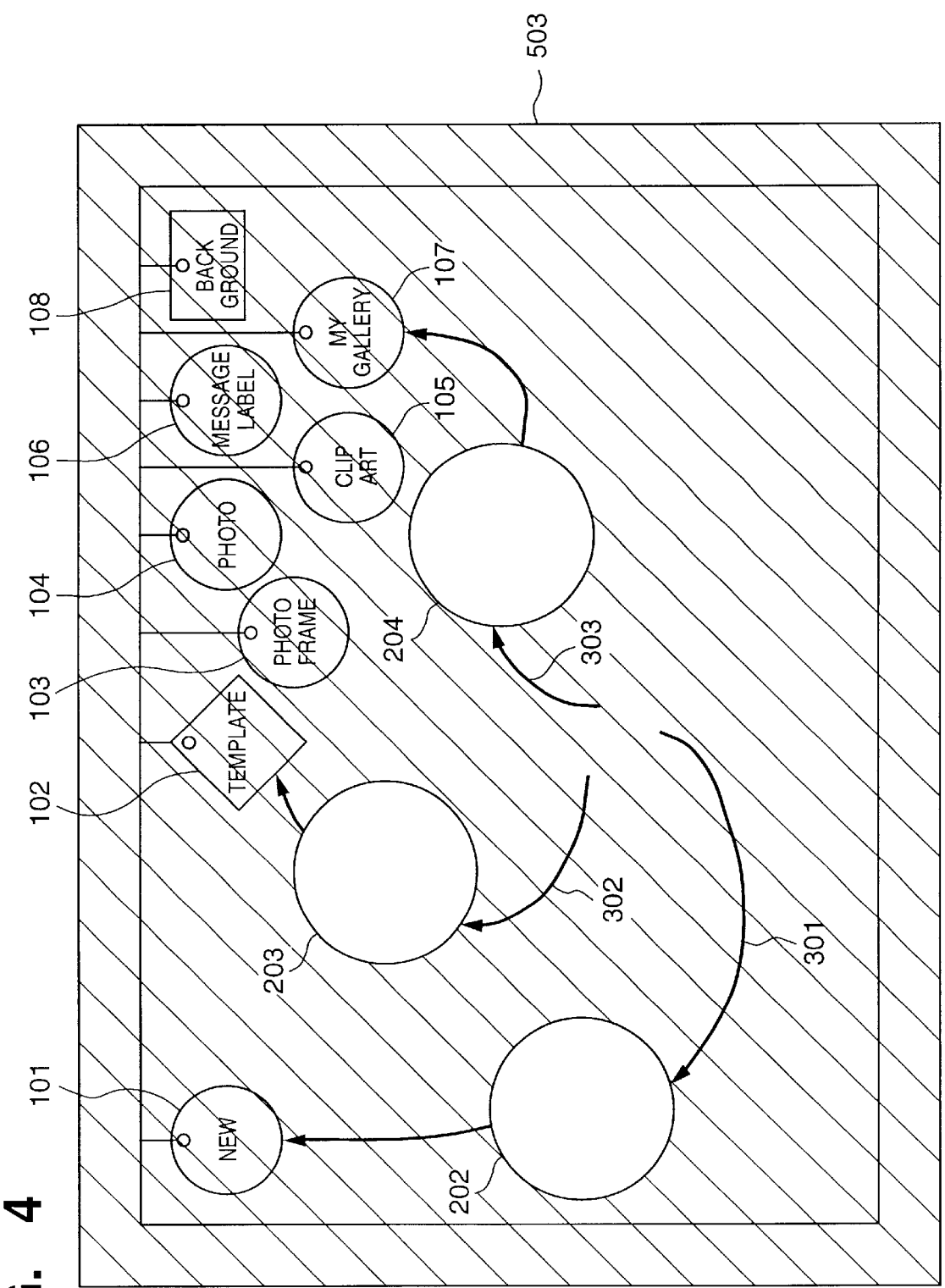

FIG. 3 shows how the guidance image 200 shown in FIG. 2 is divided into three parts. FIG. 4 shows the state where the guidance image 201 is divided into three guidance images 202 to 204, which then move to the respective items 101, 102 and 107, while respectively drawing swirling loci 301 to 303. By swirl movement of the guidance images, user's attention can be brought.

Figure 5:
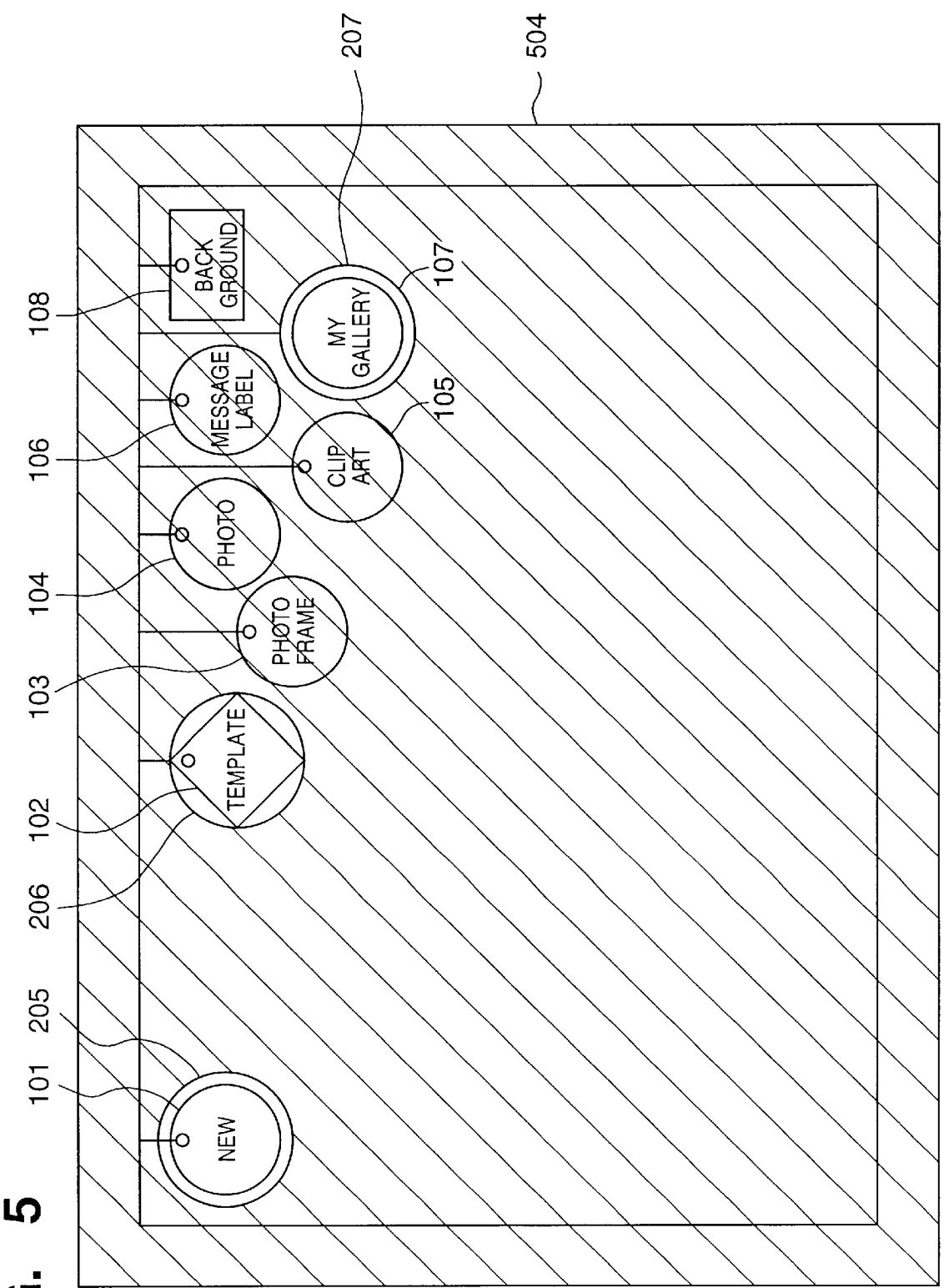

FIG. 5 shows the state in which the guidance images 202 to 204 have moved to the respective items 101, 102 and 107, and become guidance images 205 to 207 which are smaller than the original size. By changing the size of the guidance image upon being superimposed on the specified item which is prompt for operator's selection, the specified items can be shown more conspicuously to get the operator's attention.

The guidance images 205 to 207 do not have to be superimposed on the respective specified items 101, 102 and 107, but may be displayed near the respective items. Moreover, the guidance images 205 to 207 do not have to be moved as shown in FIGS. 2 to 4 to be superimposed on, or displayed near the respective specified items 101, 102 and 107, but may be superimposed on or displayed near the specified items 101, 102 and 107 immediately after the application program 1101 is started.

Figure 9:
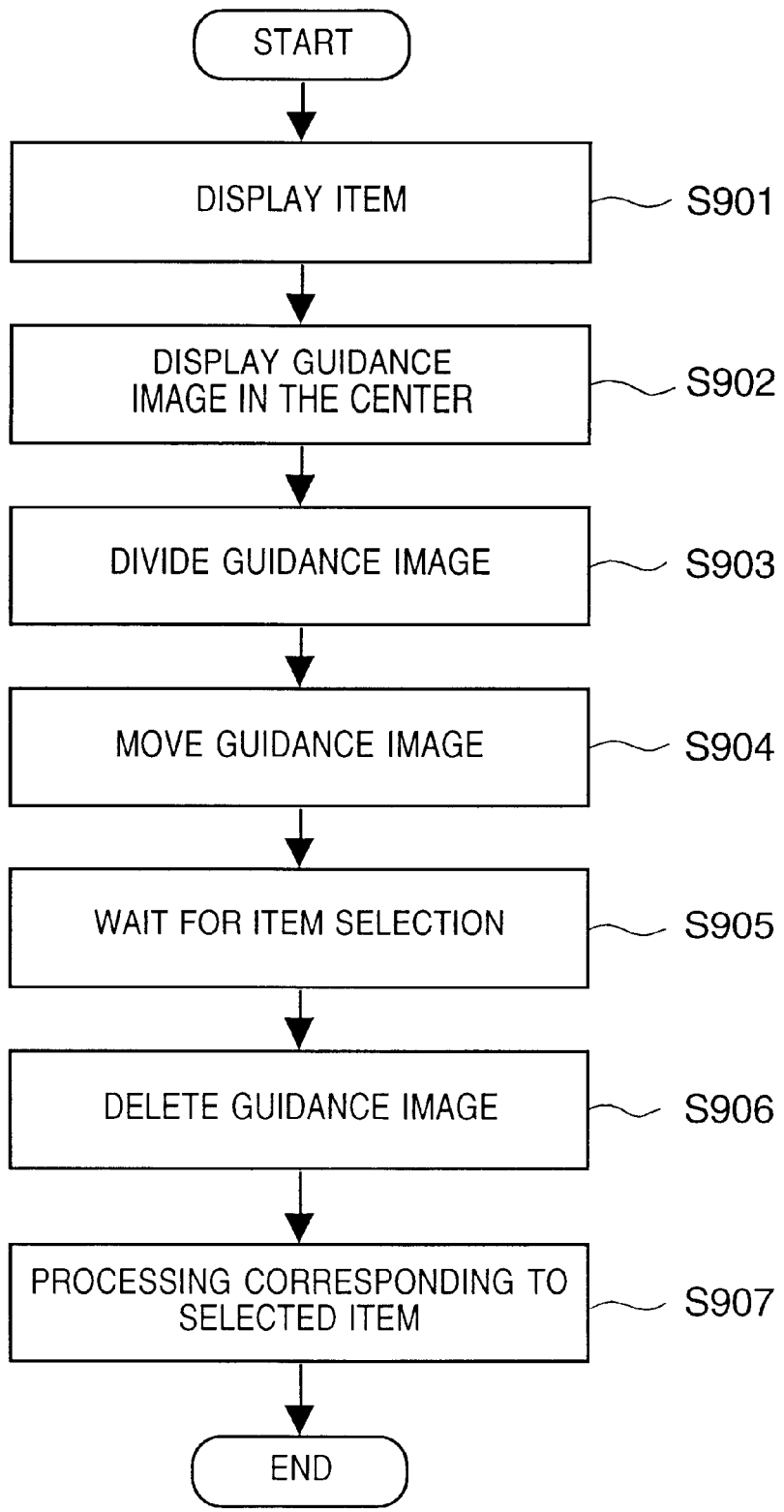
FIG. 9 is a flowchart showing part of processing of an application program.

Next, steps of the foregoing process are explained with reference to a flowchart. FIG. 9 is a flowchart showing part of the processing of application program 1101. The application program 1101 is, for instance, transferred to a load area of the RAM 8 via the floppy disk drive 10 and provided to the CPU 6.

The process shown in FIG. 9 is started immediately after the application program 1101 is started. In step S901, items 101 to 108 are displayed. In step S902, the guidance image 200 is displayed in a predetermined position of a screen of the CRT 1, e.g., the substantial center of the screen, as shown in FIG. 2. In step S903, the guidance image 200 is divided into the guidance images 202 to 204 as shown in FIGS. 3 and 4.

In step S904, the divided guidance images 202 to 204 are moved to be superimposed on, or displayed near the respective specified items 101, 102 and 107 while drawing swirling loci 301 to 303 respectively. At the position the swirling guidance image stops, the size of each of the guidance images 202 to 204 is reduced so as to become guidance images 205 to 207.

In step S905, the process waits for a user to select one of the items 101 to 108 by operating the pointing device 5. In the present embodiment, a user is able to select an item other than the specified items 101, 102 and 107. When an item is selected, all guidance images 205 to 207 are deleted in step S906.

In step S907, the process corresponding to the selected item is performed. For instance, in a case where the item New 101 is selected, a new sheet 110 for generating a new document is displayed as shown in FIG. 6. In a case where the item Template 102 is selected, a list of template 120 is displayed as shown in FIG. 7. In a case where the item MyGallery 107 is selected, a list of existing editing images is displayed as shown in FIG. 8. In a case where the item 103, 104, 105, 106 or 108 is selected, the corresponding list is similarly displayed.

As described above, a guidance image provided to draw the user's the attention is superimposed on, or displayed near the specified item. By this, a user who is not accustomed to operating an application program can easily utilize the application program.

Figure 10:
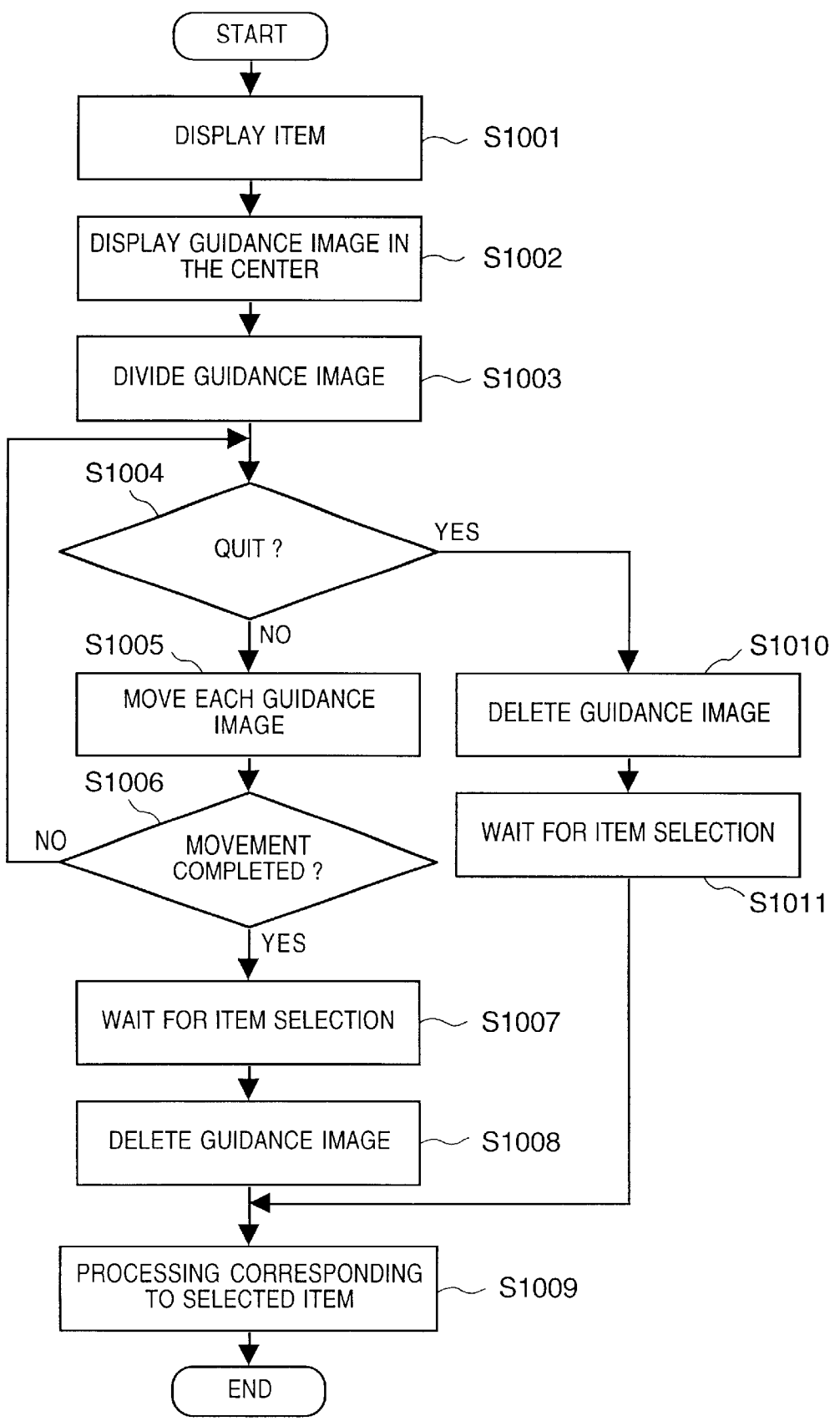
FIG. 10 is a flowchart showing part of processing of an application program according to a modified example.

Hereinafter, a modified example of the above embodiment is described. In this modified example, the processing for displaying a guidance image is terminated when an operator does not need such function. FIG. 10 is a flowchart showing a modified example of the process shown in FIG. 9.

In step S1001, items 101 to 108 are displayed. In step S1002, the guidance image 200 is displayed in a predetermined position of a screen of the CRT 1, e.g., the substantial center of the screen, as shown in FIG. 2. In step S1003, the guidance image 200 is divided into the guidance images 202 to 204 as shown in FIGS. 3 and 4.

In step S1004, determination is made as to whether or not the processing for displaying a guidance image is to be terminated. The determination can be made based on the state of a specified key on the keyboard 4 or an input by the pointing device 5 (e.g., click operation). For instance, when an ESC key is impressed on the keyboard 4, it is determined that the processing for displaying the guidance image is terminated.

In a case where the processing for displaying a guidance image is to be continued (NO in step S1004), the process proceeds to step S1005 where the divided guidance images 202 to 204 are moved to be superimposed on, or displayed near the respective specified items 101, 102 and 107 while drawing swirling loci 301 to 303 respectively. In step S1006, determination is made as to whether or not the guidance images 202 to 204 have completed moving to positions on or near the respective specified items 101, 102 and 107 (see FIG. 5). If it is completed, the process proceeds to step S1007; but if it is not completed, the process returns to step S1004.

In step S1007, the process waits for a user to select one of the items 101 to 108 by operating the pointing device 5. When an item is selected, the process proceeds to step S1008 where all guidance images 205 to 207 are deleted.

Meanwhile, in a case where the process for displaying of a guidance image is to be terminated (YES in step S1004), the process proceeds to step S1010 where all the guidance images are deleted. In step S1011, the process waits for a user to select one of the items 101 to 108 by operating the pointing device 5.

In step S1009, processing corresponding to the selected item is performed.

As has been described above, by providing a function to terminate the processing for displaying the guidance image, a user who has become accustomed to operating the application program 1101 can use the program 1101 without feeling disturbed by the guidance image.

It is noted that, as described above, a memory medium storing programs constitutes the statutory invention. For the memory medium, for instance, a floppy disk, hard disk, an optical disk, a magneto-optical disk, CD-ROM, CD-R, a magnetic tape, a non-volatile type memory card, and ROM can be used.

Furthermore, besides aforesaid functions according to the above embodiment are realized by executing the program codes which are read by a computer, it goes without saying that the above-described memory medium independently constitutes the present invention in a case where an OS (Operating System) or the like working on the computer performs a part or entire processes in accordance with designations of the program codes and realizes the functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiment.

As has been set forth above, the present invention facilitates easy selection of an item.

The present invention is not limited to the above embodiments and various changes and modifications can be made within the spirit and scope of the present invention. Therefore, to appraise the public of the scope of the present invention, the following claims are made.

What is claimed is:

1. A data processing apparatus having a function to control a display device, comprising:

item display means for displaying a plurality of items, selectable by an operator, on a screen of the display device; and guidance image display means for displaying at least two guidance images, provided to draw attention of the operator, at predetermined positions of the screen of the display device, then moving the at least two guidance images to respective specified items of the plurality of items, wherein said guidance image display means is activated irrespective of an operation by the operator.

2. A data processing apparatus having a function to control a display device, comprising:

item display means for displaying a plurality of items, selectable by an operator, on a screen of the display device; and guidance image display means for displaying a guidance image, provided to draw attention of the operator, at a predetermined position of the screen of the display device upon starting an application program, then divides the guidance image into a number of guidance images corresponding to specified items, and superimposes the divided guidance images on the respective specified items or displays the divided guidance image near the respective specified items, wherein said guidance image display means is activated irrespective of an operation by the operator.

3. The data processing apparatus according to claim 1, wherein when said guidance image display means moves the at least two guidance images to the respective specified items, said guidance image display means moves each of the guidance images such that the guidance image draws a swirling locus.

4. The data processing apparatus according to claim 1, wherein after said guidance image display means moves the at least two guidance images to the respective specified items, said guidance image display means superimposes each of the guidance images on the respective specified items or displays each of the guidance images near the respective specified items.

5. The data processing apparatus according to claim 4, wherein when said guidance image display means superimposes each of the guidance images on the respective specified items or displays each of the guidance images near the respective specified items, said guidance image display means changes the size of each guidance image.

6. The data processing apparatus according to claim 1, further comprising guidance image deleting means for deleting the one or more guidance images from the screen of the display device after an operator selects an item from the plurality of selectable items.

7. The data processing apparatus according to claim 1, wherein said guidance image is an image having a predetermined shape and a color of a higher brightness than other parts of the screen.

8. The data processing apparatus according to claim 1, wherein said guidance image is an image of a substantial circle having a higher brightness than other parts of the screen.

9. The data processing apparatus according to claim 1, wherein said guidance image is a spotlight-like image.

10. The data processing apparatus according to claim 1, further comprising switch means for switching whether or not said guidance image display means is to be activated.

11. A data processing method of controlling an image displayed on a display device, comprising the steps of:

displaying a plurality of items, selectable by an operator, on a screen of the display device; and displaying at least two guidance images, provided to draw attention of the operator, at predetermined positions of the screen of the display device, then moving the at least two guidance images to respective specified items of the plurality of items, wherein said step of displaying and moving the at least two guidance images is performed irrespective of an operation by the operator.

12. A data processing method of controlling an image displayed on a display device, comprising the steps of:

displaying a plurality of items, selectable by an operator, on a screen of the display device; and displaying a guidance image, provided to draw attention of the operator, at a predetermined position of the screen of the display device upon starting an application program, then dividing the guidance image into a number of guidance images corresponding to specified items, and superimposing the divided guidance images on the respective specified items or displaying the divided guidance images near the respective specified items, wherein said guidance image display step is performed irrespective of an operation by the operator.

13. The data processing method according to claim 11, wherein when the at least two guidance images are moved to the respective specified items, each of the guidance images is moved such that the guidance image draws a swirling locus.

14. The data processing method according to claim 11, wherein after the at least two guidance images are moved to the respective specified items, each of the guidance images is superimposed on the respective specified items or displayed near the respective specified items.

15. The data processing method according to claim 14, wherein when each of the guidance images is superimposed on the respective specified items or displayed near the respective specified items, the size of each guidance image is changed.

16. The data processing method according to claim 11, further comprising the step of deleting the one or more guidance images from the screen of the display device after an operator selects an item from the plurality of selectable items.

17. The data processing method according to claim 11, wherein said guidance image is an image having a predetermined shape and color of a higher brightness than other parts of the screen.

18. The data processing method according to claim 11, wherein said guidance image is an image of a substantial circle having a higher brightness than other parts of the screen.

19. The data processing method according to claim 11, wherein said guidance image is a spotlight-like image.

20. The data processing method according to claim 11, further comprising the step of switching whether or not execution of said guidance image displaying and moving step is to be terminated.

21. A memory medium storing program codes for controlling an image displayed on a display device, said program codes including:

codes for a step of displaying a plurality of items, selectable by an operator, on a screen of the display device; and codes for a step of displaying guidance images, provided to draw attention of the operator, at predetermined positions of the screen of the display device, then moving the at least two guidance images to respective specified items of the plurality of items, wherein said step of displaying and moving the guidance images is performed irrespective of an operation by the operator.

22. A memory medium storing program codes for controlling an image displayed on a display device, said program codes including:

codes for an item display step of displaying a plurality of items, selectable by an operator, on a screen of the display device; and codes for a guidance image display step of displaying a guidance image, provided to draw attention of the operator, at a predetermined position of the screen of the display device upon starting an application program, then dividing the guidance image into a number of guidance images corresponding to specified items, and superimposing the divided guidance images on the respective specified items or displaying the divided guidance images near the respective specified items, wherein said guidance image display step is performed irrespective of an operation by the operator.

23. A computer readable program for controlling an image displayed on a display device, comprising the steps of:

displaying a plurality of items, selectable by an operator, on a screen of the display device; and displaying at least two guidance images, provided to draw attention of the operator, at predetermined positions of the screen of the display device, then moving the at least two guidance images to respective specified items of the plurality of items, wherein said step of displaying and moving the guidance images is performed irrespective of the operation by the operator.

24. A computer readable program for controlling an image displayed on a display device, comprising:

an item display step of displaying a plurality of items, selectable by an operator, on a screen of the display device; and a guidance image display step of displaying a guidance image, provided to draw attention of the operator, at a predetermined position of the screen of the display device upon starting an application program, then dividing the guidance image into a number of guidance images corresponding to specified items, and superimposing the divided guidance images on the respective specified items or displaying the divided guidance images near the respective specified items, wherein said guidance image displaying step is performed irrespective of the operation by the operator.

* * * * *

UNITED STATES PATENT AND TRADEMARK OFFICE
CERTIFICATE OF CORRECTION

PATENT NO. : 6,335,740 B1
DATED : January 1, 2002
INVENTOR(S) : Mitsuharu Tanaka It is certified that error appears in the above-identified patent and that said Letters Patent is hereby corrected as shown below:

<u>Column 8,</u>
Line 19, "one or more" should be deleted.

<u>Column 9,</u>
Line 12, "one or more" should be deleted.

Signed and Sealed this

Tenth Day of September, 2002

*Attest:*

JAMES E. ROGAN
*Attesting Officer*   *Director of the United States Patent and Trademark Office*